Nov. 29, 1927.
C. HARTER
1,650,792
BRAKE BEAM SUPPORT
Filed Sept. 23, 1926
2 Sheets-Sheet 1
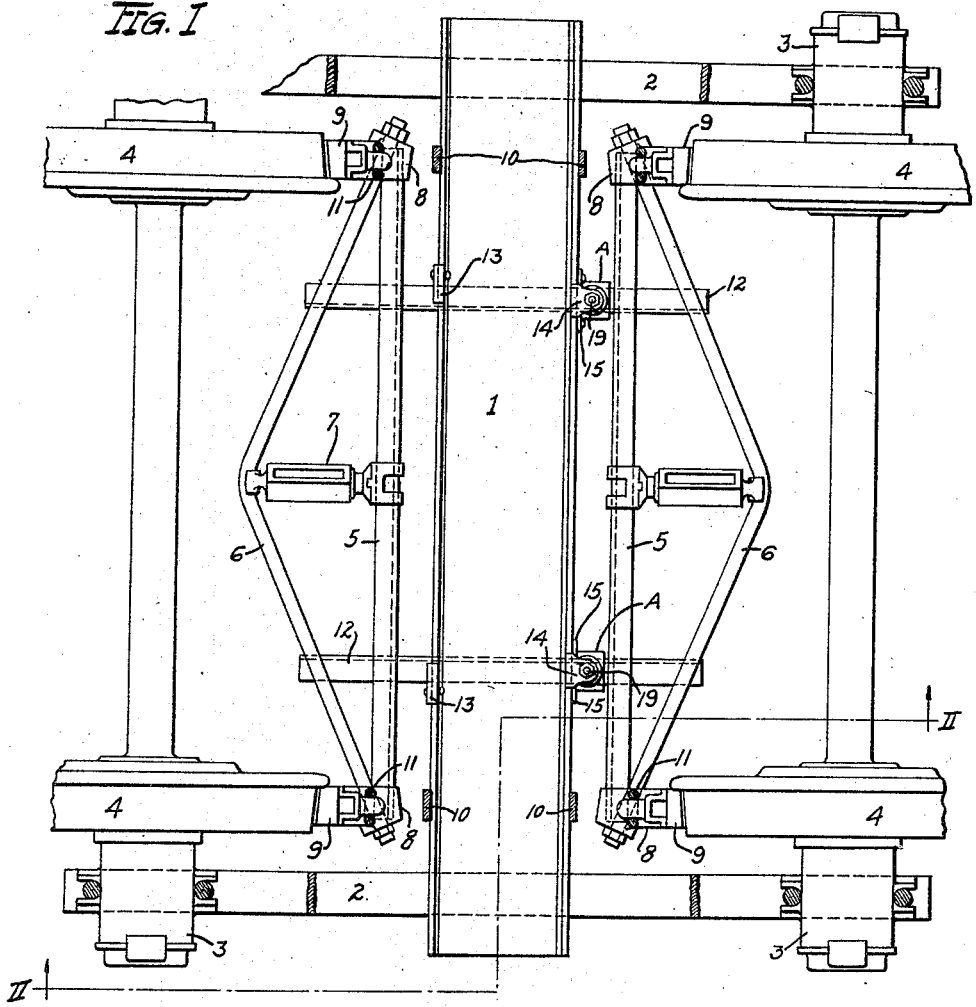
Fig. I
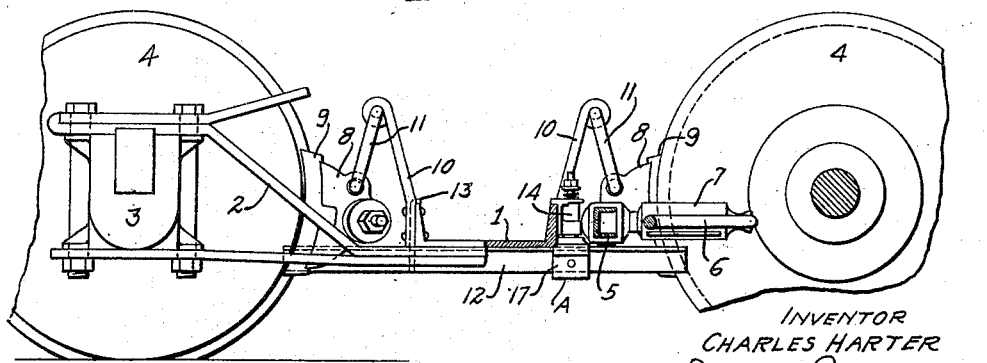
Fig. II
INVENTOR
CHARLES HARTER
By Cook & McCauley ATTYS Nov. 29, 1927.
C. HARTER
1,650,792
BRAKE BEAM SUPPORT
Filed Sept. 23, 1926
2 Sheets-Sheet 2
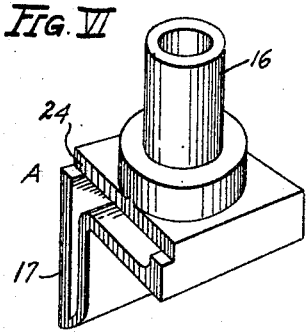
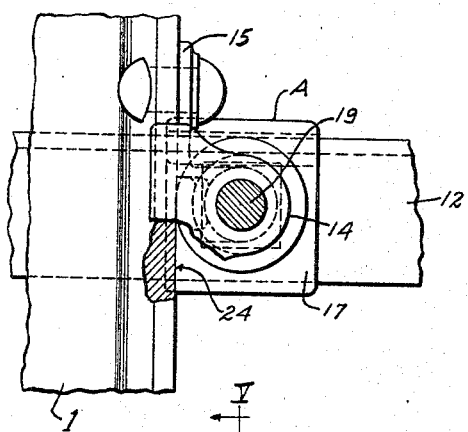
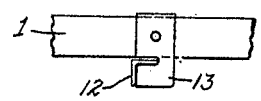
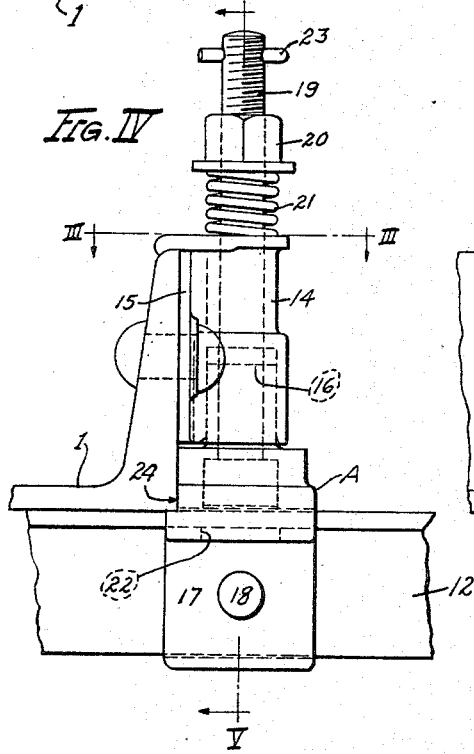
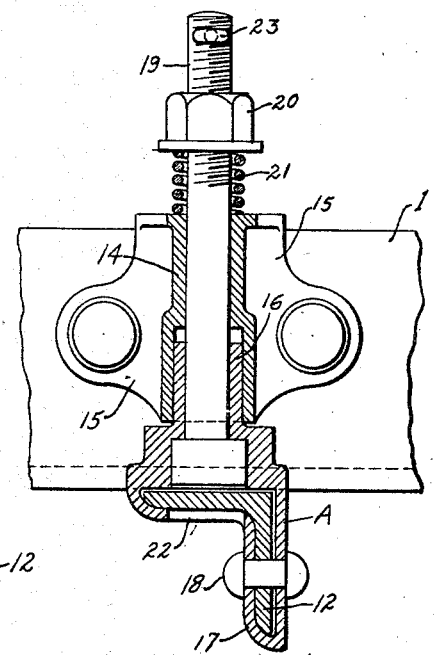
INVENTOR
CHARLES HARTER
BY Cook & McCauley ATTYS.

Patented Nov. 29, 1927.

1,650,792

UNITED STATES PATENT OFFICE.

CHARLES HARTER, OF ST. LOUIS, MISSOURI.

BRAKE-BEAM SUPPORT.

Application filed September 23, 1926. Serial No. 137,262.

This invention relates to brake-beam supports adapted for use as safety devices on the trucks of railway cars. Brake-beams are ordinarily suspended from the truck frame, and the invention herein disclosed is based upon certain features of a safety device adapted to receive and hold the brake-beam in the event of breakage allowing the beam to fall from its normal position.

Prior to this invention, truck frames have been equipped with auxiliary supporting bars extending below the brake-beams to serve as supports therefor in the event of breakage of the suspension devices which ordinarily support the brake-beams, and these auxiliary supporting bars have been riveted to the bottom of the spring plank. In some types of car trucks, the bottom of the spring plank is the most convenient location for the auxiliary supporting bars, but in actual practice it is often necessary to remove these supporting bars to permit removal of the brake-beams.

An object of the present invention is to produce an auxiliary brake-beam support securely held below a brake-beam to serve as an effective safety device in the event of breakage of the regular supporting means, and adapted to be easily displaced to permit removal of the brake-beam. In the preferred form of the invention, the auxiliary support is pivotally secured to the truck frame so as to permit pivotal displacement of said support, and the attaching means includes a device for preventing accidental displacement.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a top view, partly in section, showing portions of a car-truck equipped with brake-beam supports embodying the features of this invention.

Fig. II is a section taken approximately on the line II—II in Fig. I.

Fig. III is an enlarged detail view showing a portion of the spring plank and a portion of the brake-beam support attached thereto, this view being a section on the line III—III in Fig. IV, with parts broken away to show the abutments which prevent accidental displacement of the support.

Fig. IV is a side elevation of the parts shown in Fig. III.

Fig. V is a vertical section on the line V—V in Fig. IV.

Fig. VI is a perspective view of the holder for the brake-beam support.

Fig. VII is a detail view showing a portion of the spring plank and a member extending therefrom to receive and hold a portion of the brake-beam support.

To illustrate the invention I have shown some of the elements of an ordinary car truck. The frame of this truck includes a spring plank 1 in the form of a channel beam and arch bar side frames 2 at the ends of the spring plank. Journal boxes 3 are secured to the side frames 2, and the wheels 4 may be provided with the usual journals (not shown) extending into the journal boxes.

Each of the brake-beams shown in Figs. I and II comprises a compression member 5, a tension member 6, and a strut 7 between said members and a brake head 8 at the ends of said members, each head being equipped with a shoe 9 adapted to engage one of the wheels.

To illustrate suitable brake hangers, I have shown arms 10 extending upwardly from the spring plank 1, and suspension links 11 connecting the brake heads 8 to the upper ends of said arms. The brake-beams are thus suspended in the truck and they can be operated in the usual manner to force the shoes 9 onto the wheels.

The auxiliary supporting device comprises a pair of horizontal angle bars 12 extending across the bottom of the spring plank 1 and projecting from the sides thereof to lie below and adjacent to the brake beams. Supporting plates 13 are secured to one side of the spring plank as shown in Figs. I, II and VII, and each of these plates has a downwardly extending portion interlocked with one of the angle bars 12, the plate being recessed to receive the horizontal leg of the angle bar. Each plate 13 is thus provided with a portion which lies below and contacts with a portion of a bar 12 to prevent downward displacement of said bar.

Each bar 12 is pivotally connected to the spring plank 1 by means of an attaching device including a vertical bearing 14 having flanges 15 riveted to one side of the spring plank, and a holder A located below said bearing and provided with a tubular extension 16 pivotally mounted in said bearing, as shown most clearly in Fig. V. The lower portion 17 of the holder A (Figs. IV, V and VI) surrounds and conforms to the shape of the angle bar 12, and it is secured to said bar by means of a rivet 18. 19 designates a vertical pivot bolt passing through the tubular extension 16 and projecting from the upper end of the bearing 14. A nut 20 (Figs. IV and V) is screwed onto the upper end of bolt 19 and a spring 21 is interposed between said nut and the top of the bearing 14 to yieldingly secure the holder A and bar 12 to said bearing.

The head of the bolt 19 lies in a socket in the holder A as shown in Fig. V, and this holder is provided with an opening 22 through which the bolt is inserted before the bar 12 is mounted in said holder. It will be noted that the bar 12 lies directly between the head of the bolt and the opening 22. The nut 20 can be adjusted to vary the pressure of spring 21, and accidental removal of this nut is prevented by a cotter pin 23 at the upper end of the bolt.

To prevent accidental displacement about the vertical axis of this pivotal mounting, the holder A is provided with a straight abutment face 24 (Figs. III, IV and V) which normally engages one side of the spring plank 1. The spring 21 normally cooperates with the bolt 19 and holder A to retain this abutment face in engagement with the spring plank. However, when it is desired to displace a bar 12 to locate it entirely beyond the vertical planes of the brake-beams, said bar is forced downwardly to remove the abutment 24 from the spring plank and then moved horizontally about the axis of the pivot bolt 19.

In the device I have shown, each supporting bar 12 normally lies below both brake-beams and the pivotal motion will displace the bar from the planes of both beams. The supporting plate 13 does not interfere with this pivotal motion for the bar 12 can be readily withdrawn from the recess in said plate.

The bars 12 normally lie slightly below the brake-beams, and said bars are so securely held by the pivotal mountings and plates 13 that in the event of breakage causing a brake-beam to fall onto said bars, the brakes can be safely applied without releasing the brake-beam from the truck.

I claim:

1. A brake-beam support comprising a supporting member adapted to lie below the brake-beam, and attaching means to secure said member to a car truck, said attaching means including an attaching element adapted to be rigidly secured to the truck, an attaching element secured to said supporting member, a vertical pivot connecting said attaching elements, one of said elements being movable about the axis of said vertical pivot to permit manual displacement of said supporting member, and means cooperating with said attaching elements to prevent accidental displacement of said supporting member.

2. A brake-beam support comprising a supporting member adapted to lie below the brake-beam, and attaching means to secure said member to a car truck, said attaching means including an attaching element adapted to be rigidly secured to the truck, an attaching element carried by said supporting member, a vertical pivot uniting said attaching elements, one of said attaching elements being movable downwardly at the vertical pivot to permit displacement of said supporting member, and means for preventing accidental displacement of said member.

3. A brake-beam support comprising a supporting member adapted to lie below the brake-beam, and attaching means to secure said member to a car truck, said attaching means including interlocking elements permitting displacement of said supporting member, and a spring cooperating with said interlocking elements to prevent accidental displacement of said supporting member.

4. In a car truck provided with a frame, a brake-beam support comprising a bar extending from said frame to lie below the brake-beam, a bearing secured to said frame, a holder located below said bearing and secured to said bar, said holder having an extension pivotally mounted in said bearing and an abutment cooperating with said frame to prevent pivotal displacement of said bar and holder, and a spring associated with said holder to yieldingly retain said abutment in its operative position.

5. In a car truck provided with a frame including a spring plank, a brake-beam support comprising a bar extending across the bottom of said spring plank and projecting from the sides thereof to lie below the brake-beams, a supporting member extending downwardly from one side of said spring plank to lie below and contact with a portion of said bar, a bearing located at the other side of said spring plank, a pivot device secured to said bar and mounted in said bearing to permit pivotal displacement of said bar, and means for preventing accidental displacement of said bar.

6. In a car truck provided with a frame including a pring plank, a brake-beam support comprising a bar extending across the bottom of said spring plank and projecting from the sides thereof to lie below the brake-beams, a supporting member extending downwardly from one side of said spring plank to lie below and contact with a portion of said bar, a bearing located at the other side of said spring plank, a pivot device secured to said bar and mounted in said bearing, said pivot device being provided with an abutment to prevent pivotal displacement of said bar, and a spring associated with said pivot device to yieldingly retain said abutment in its operative position.

7. In a car truck provided with a frame including a spring plank, a brake-beam support comprising a bar extending across the bottom of said spring plank and projecting from the sides thereof to lie below the brake-beams, a supporting member extending downwardly from one side of said spring plank to lie below and contact with a portion of said bar, a vertical bearing on the other side of said spring plank, a holder located below said bearing and secured to said bar, said holder having a tubular extension pivotally mounted in said bearing, said holder also having an abutment cooperating with the spring plank to prevent pivotal motion of said bar and holder, a pivot bolt passing through said tubular extension and projecting from the upper end of said bearing, a nut on said pivot bolt, and a spring arranged between said nut and bearing to yieldingly secure said bar and holder to said bearing, said bar and holder being movable downwardly to remove said abutment from the spring plank.

8. A brake beam support comprising a supporting member adapted to lie below the brake beam, and attaching means to secure said supporting member to a car truck, said attaching means including a vertical pivot permitting pivotal displacement of said supporting member, an abutment to prevent accidental pivotal displacement of said supporting member, said supporting member being movable downwardly at the pivot to displace said abutment, and means to prevent accidental downward movement of said supporting member.

9. In a car truck provided with a frame, a brake-beam support comprising a bar extending from said frame to lie below the brake-beam, a bearing secured to said frame, a holder located below said bearing and secured to said bar, said holder having an extension pivotally mounted in said bearing and an abutment cooperating with said frame to prevent pivotal displacement of said bar and holder, and means cooperating with said holder to removably secure said abutment in its operative position.

10. In a car truck provided with a frame, a brake-beam support extending from said frame to lie below the brake-beam, and a vertical pivot member securing said support to said frame to permit pivotal displacement of said support, said vertical pivot member being entirely above said support.

11. In a car truck provided with a frame, a brake-beam support extending from said frame to lie below the brake-beam, a holder secured to said support, and a vertical pivot member securing said holder to said frame to permit pivotal displacement of said support and holder, said vertical pivot member being entirely above said support.

12. In a car truck provided with a frame including a spring plank, a brake-beam support comprising a bar extending from the spring plank to lie below the brake-beam, a vertical bearing at one side of said spring plank, a holder located below said bearing and secured to said bar, said holder having a tubular extension pivotally mounted in said vertical bearing, said holder also having an abutment to prevent pivotal motion of said bar and holder, a vertical pivot bolt passing through said tubular extension and projecting from the upper end of said bearing, a nut on said pivot bolt, and means cooperating with said bolt to secure said bar and holder to said bearing, said bar and holder being movable downwardly to displace said abutment and thereby permit pivotal motion of said bar and holder.

In testimony that I claim the foregoing I hereunto affix my signature.

CHARLES HARTER.